United States Patent

[11] 3,536,106

[72] Inventor Norman G. Anderson
Oak Ridge, Tennessee
[21] Appl. No. 756,265
[22] Filed Aug. 29, 1968
[45] Patented Oct. 27, 1970
[73] Assignee the United States of America as represented by the United States Atomic Energy Commission

[54] METHOD FOR MEASUREMENT AND TRANSFER OF SMALL FLUID VOLUMES
4 Claims, 2 Drawing Figs.

[52] U.S. Cl. .................................................. 141/1,
141/12, 141/34, 141/73
[51] Int. Cl. .......................................................... B65b 1/14
[50] Field of Search ........................................... 141/12, 1,
34, 73; 264/(Examiner); 53/(Examiner); 73/(Examiner)

[56] References Cited
UNITED STATES PATENTS
1,663,696  3/1928  Fraass ........................ 141/34
2,174,335  9/1939  Tear .......................... 141/34

Primary Examiner—Fred C. Mattern, Jr.
Assistant Examiner—Richard J. Sher
Attorney—Roland A. Anderson ABSTRACT: A method and apparatus have been provided for accurately measuring and transferring volumetric discrete samples on a microanalytical scale. This system is applicable to operations in both zero and nonzero gravity environments and readily adaptable to automated processes. Specially designed containers are filled and emptied using centrifugation to overcome the effects of surface tension in the sample and thereby provide a highly accurate and reproducible volumetric measuring system.

Patented Oct. 27, 1970

3,536,106

INVENTOR.
Norman G. Anderson
BY
Roland A. Anderson
ATTORNEY.

METHOD FOR MEASUREMENT AND TRANSFER OF SMALL FLUID VOLUMES

BACKGROUND OF THE INVENTION

This invention was made during the course of, or under, a contract with the U.S. Atomic Energy Commission.

The present invention relates to volumetric measuring methods and appartus therefor, and more specifically to a method and apparatus for accurately measuring and quantitatively transferring small samples and reagent volumes.

In discrete sample analysis volumes are most accurately controlled by using volumetric measuring devices. However, in microscale analytical chemistry work, numerous difficulties arise in maintaining the ratio of reactants constant in order to obtain accurate results. This is a classical problem in analytical chemistry and one which has not been previously solved for automated systems in which a large number of samples for a single substance are analyzed.

Basically, there are six problems which plague fluid transfer volume-measuring devices, especially small volumes. The first is the problem of reproducibly defining the space to be filled. With syringes this means pulling the syringe to a predetermined mark. If a pipette is used, then a sensing device may be used to determine when the desired liquid level has been reached. The second problem is the inclusion of air bubbles in the measured liquid volume. In manual analysis this is checked by visual inspection. The third problem is the elimination of droplets adhering to the tips and sides of the measuring container. Few satisfactory solutions to this problem in automated systems have been proposed. The fourth problem is to quantitatively or at least reproducibly empty the sample container. This again is visually inspected in manual methods. The fifth problem is cross-contamination of samples. The sixth and last problem is that of making the measuring device independent of variations in the density, viscosity, or surface tension of solutions being measured.

SUMMARY OF THE INVENTION

The present invention comprises a method and apparatus therefor for measuring and transferring fluid samples involving centrifugation which overcomes the above set forth problems. Therefore, it is an object of this invention to provide a method for accurately collecting and transferring fluid samples.

Another object of this invention is to provide a method of measureing and transferring fluid samples which is amenable to automation.

Another object of this invention is to provide a method and apparatus therefore for fluid sample measurement and transfer thereof which is operable in both zero and nonzero gravity environments.

Still another object of the present invention is to provide a method and apparatus therefore in which solutions differing in density, viscosity, and surface tension are accurately measured independent of these factors.

Further, it is an object of this invention to provide apparatus including a precision molded volumetric sample holder for carrying out the present method.

Yet another object of this invention is to provide a method and apparatus therefor for measuring and transferring fluid samples wherein the collected samples are centrifuged during filling and transferring in order to overcome the above-described problems.

Therefore, according to the present invention, there is provided a method for accurately isolating a predetermined volumetric sample of fluid on a microanalytical scale comprising the steps of completely immersing an empty sample holder within a reservoir of fluid to be sampled, said sample holder defining a cavity of predetermined volume which terminates in an open mouth defined by an upstanding sharp-edged rim, centrifuging the reservoir containing the sample holder to fill the holder with fluid and to exclude air bubbles, removing sufficient fluid from said reservoir so that the sharp-edged rim is no longer immersed therein, and centrifuging the sample holder a second time in a manner tending to flatten the fluid meniscus in the open mouth at a level even with the sharp-edged rim.

The apparatus of the present invention includes at least one precision molded sample holder generally cylinderical in shape defining a predetermined volumetric cavity which terminates in an open mouth defined by an upstanding sharp-edged rim.

Other objects and many of the attendant advantages of the present invention will become evident from the following description when taken in conjunction with the accompanying drawings.

DETAILED DESCRIPTION OF THE INVENTION

Figure 2:
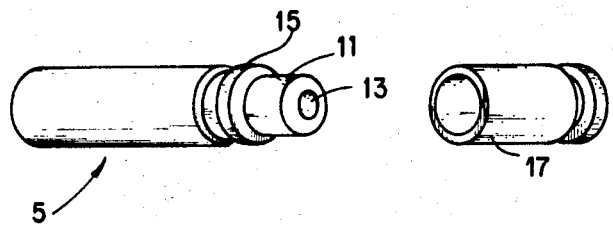
FIG. 2 is a pictorial view of a sample holder according to the present invention.
Figure 1:
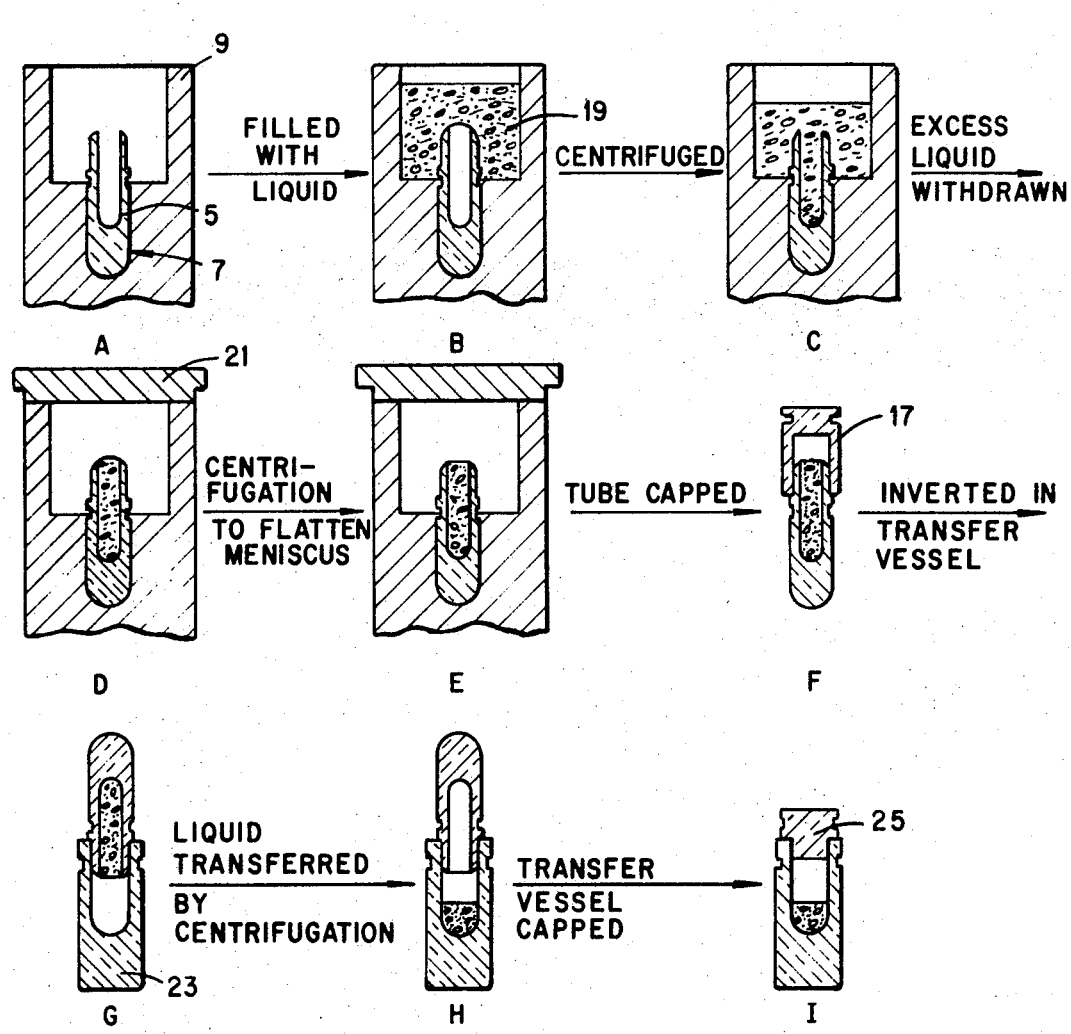
FIG. 1 is a schematic diagram showing the various steps of the present method of discrete volumetric sample collecting and transfer according to the present invention.

Referring now to FIG. 1, there is shown a specially designed, precision-molded sample holder 5 disposed in a well 7 provided in a centrifuge cup-shaped reservoir 9. The sample holder 5 is preferably a precision die-molded tube having a cavity defining an exact volume which does not need to be calibrated. As shown in FIG. 2, holder 5 is generally cylindrical in shape, has relatively thick walls, and an upwardly extending mouth portion 11 terminated in a sharp-edged rim 13 to prevent droplet adherence to the tube mouth. Since the volumes of the tubes are in the range from 10 to 500 microliters, the tube has rather small dimensions and the adherence of a single droplet would substantially reduce the accuracy of the sample volume. The tube 5 is further provided with an annular ring 15 which serves as a stop for sealing a tube cap 17 or a transfer container which is placed over the tube mouth in a female slip-fit relationship. The tube cap prevents evaporation of the sample once the tube has been filled and allows the operator to store the samples once they have been collected and awaiting transfer. Further reduction of the effect of evaporation is provided by increasing the ratio of the cavity length to the cavity diameter.

Preferably, the tubes are molded from a dimensionally stable plastic which is inert, nonwetting, and does not absorb moisture. Materials of the fluorinated hydrocarbon variety such as polytrifluorochloroethylene sold under the trade mark Kel-F by M. W. Kellogg Company, Jersey City, New Jersey, has been found to be the preferred molding material. This plastic material has been found to have the least amount of liquid absorption and resistance to fluid adhesion. The tube cavity is formed by molding the plastic around a steel pin which is reproducibly withdrawn from the mold, thereby providing a means of producing standardized volumes.

To ensure that no air bubbles interfere with volume measurements, the holder 5 is placed in the centrifuge cup 9 as shown in step A of FIG. 1. The cup is then filled to a point substantially above the mouth of tube 5 with a liquid 19 which is to be sampled, as shown in step B, and centrifuged to fill the entire volume of the tube cavity, as shown in step C. Even the smallest air bubbles are floated out in a field of several hundred X $g$. The centrifuge is then stopped and the excess liquid is removed from the centrifuge cup, as shown in step D, and the sample volume is centrifuged a second time to flatten the liquid meniscus, step E. To reduce wind effects, the centrifuge cup 9 may be covered by a cap 21 shown in steps D and E. The continuation of centrifugation after excess fluid around the tube has been removed will, in the absence of wind effects, produce a very flat meniscus. The excess sample volume may be removed manually or automatically by suction at rest, by merely tipping the cup at rest, or by opening a port in the bottom of the cup (not shown) either during rotation or at rest.

The tubes are best held in a hollow-bowl centrifuge rotor which can be closed at the top to minimize the effects of windage.

After the tube is filled, the cap 17 may be inserted to prevent evaporation as the sample is taken from the centrifuge (step F). At this point the samples may be left in the capped sample holder 5 or inverted in a transfer container 23 (step G) and centrifuged (step H) to quantitatively transfer the sample volume to the transfer container and finally capping the transfer container with a seal fit lid 25 (step I) for subsequent analysis.

The transfer containers 23, for example, may be made in the form of small plastic cuvettes in which the sample may be mixed with an appropriate reagent by rapidly altering the speed of the centrifuge. This technique is adapted to reactions in which a sample and one or more different reagents are mixed to yield a color which can be analyzed by instruments employing various light transmitting techniques, such as colorimeters or spectrophotometers.

Various experiments have been carried out employing the steps shown in FIG. 1. After centrifugal filling, the tubes 5 were capped and weighed. They were then uncapped and inserted in the transfer containers 23 and the latter capped and weighed to check the volumetric reproducibility and limits of precision attainable in filling the sample holder and transferring the sample to the transfer container according to the present method.

EXAMPLE I

In the first experiment water was used as the sample fluid. Two sizes of tubes having similar external dimensions were used. The tube cavities were five-eighths inch deep with diameters of one-eighth and one-sixteenth inch, respectively. The radius from the centrifuge axis to the meniscus in the measuring tube was 11 cm., while the radius to the top of the transfer container was 18 cm. All tests were made at room temperature (25°C.). The centrifuge was accelerated rapidly to speed in each instance and turned off as soon as speed was reached. Tube filling was done at 2,000 r.p.m. (490 ×g) while meniscus leveling was done at 2,500 r.p.m. (769 ×g). Transfer was done at 2,000 r.p.m. (805 ×g).

Calculations show that the maximum height of a water droplet at 770 ×g is 139 microns. This is less than 1 percent of the height of the liquid column. Thus, variation in meniscus curvature produced by differences in fluid density or surface tension is therefore only a small fraction of 1 percent of the volume.

The results obtained with pure water in Kel-F and nylon tubes are shown in table 1.

TABLE I

| Tube No. | Wt. of Water in tube (mg.) | Wt. of Water in Transfer Vessel (mg.) |
|---|---|---|
| *Results with ⅛ × ⅝ in. Cavity* | | |
| 1. Kel-F | 122.0 | 122.3 |
| | 120.4 | 120.4 |
| | 122.0 | 122.2 |
| | 122.5 | 122.3 |
| | 122.7 | 122.4 |
| | 122.3 | 122.3 |
| Avg. | 122.0 | 122.0 |
| SD, mg. (0.60%) | 0.75 | |
| Vol., μl | 122.2 | 122.2 |
| 2. Kel-F | 123.6 | 123.5 |
| | 123.2 | 123.0 |
| | 123.1 | 122.9 |
| | 124.1 | 123.8 |
| | 123.5 | 123.4 |
| Avg. | 123.5 | 123.3 |
| SD, mg. (0.28%) | 0.35 | |
| Vol., μl | 123.7 | 123.5 |
| 3. Kel-F | 121.3 | 120.9 |
| | 120.9 | 121.1 |
| | 121.0 | 120.6 |
| | 121.5 | 121.4 |
| | 121.7 | 121.2 |
| Avg. | 121.3 | 121.0 |
| SD, mg. (0.29%) | 0.35 | |
| Vol., μl | 121.5 | 121.3 |
| 4. Nylon | 125.0 | 123.8 |
| | 124.4 | 123.6 |
| | 124.3 | 123.6 |
| | 125.1 | 125.8 |
| | 123.9 | 123.2 |
| Avg. | 124.7 | 124.0 |
| SD, mg. (0.61%) | 0.77 | |
| Vol., μl | 124.9 | 124.2 |
| *Results with 1/16 × ⅝ in. Cavity* | | |
| 5. Kel-F | 32.2 | 32.0 |
| | 32.0 | 31.8 |
| | 32.1 | 31.8 |
| | 32.0 | 31.9 |
| | 32.0 | 31.9 |
| Avg. | 32.1 | 31.9 |
| SD, mg. (0.25%) | 0.08 | |
| Vol., μl | 32.1 | 31.9 |
| 6. Kel-F | 32.2 | 32.1 |
| | 32.2 | 32.2 |
| | 32.1 | 32.0 |
| | 32.1 | 32.0 |
| | 32.2 | 32.2 |
| Avg. | 32.2 | 32.1 |
| SD, mg. (0.15%) | 0.049 | |
| Vol., μl | 32.2 | 32.2 |
| 7. Kel-F | 31.7 | 31.7 |
| | 31.8 | 31.8 |
| | 31.9 | 31.8 |
| | 31.8 | 31.7 |
| | 31.9 | 31.9 |
| Avg. | 31.8 | 31.9 |
| SD, mg. (0.19%) | 0.06 | |
| Vol., μl | 31.9 | 32.0 |
| 8. Nylon | 31.5 | 30.8 |
| | 31.4 | 31.0 |
| | 31.1 | 30.8 |
| | 31.0 | 30.9 |
| | 31.2 | 31.0 |
| Avg. | 31.2 | 30.9 |
| SD, mg. (0.61%) | 0.19 | |
| Vol., μl | 31.3 | 31.0 |

Using three different Kel-F tubes standard deviations (SD) of 0.6, 0.28, and 0.29 percent were observed. The nylon tube gave a standard deviation of 0.61 percent. Three smaller tubes of approximately 30 microliters volume gave standard deviations of replicate filling of 0.25, .15, and 0.19 percent, while the single nylon tube had a standard deviation of 0.61 percent.

In the centrifugal transfer the average losses in four series of experiments were 0.0, 0.2, and 0.2 mg. for Kel-F tubes and 0.8 for nylon using the large tubes. With the smaller tubes average losses were 0.2, 0.1 and 0.05 mg. in three sets of experiments with Kel-F tubes, and 0.3 mg. with a nylon measuring tube.

EXAMPLE II

Additional experiments were performed as above using the same tubes as indicated by tube number, but with a 0.05 percent solution of sodium dodecyl sulfate and with 45.1 percent sucrose in place of water, as shown in table II. This experiment was run to check the effects of fluid viscosity, density and surface tension on volume measurement.

TABLE II

| Tube No. | Wt. in Measuring Tube (mg.) | Wt. in Transfer Vessel (mg.) |
|---|---|---|
| *0.05% Sodium Dodecyl Sulfate* | | |
| 1 | [1]122.0 | 122.5 |
|   | 122.0 | 122.0 |
|   | 122.5 | 122.5 |
|   | 122.0 | 122.0 |
| Average | 122.17 | 122.25 |
| Volume, μL | 122.4 | 122.5 |
| 5 | 31.9 | 31.7 |
|   | 31.9 | 31.8 |
|   | 31.9 | 31.9 |
|   | 31.9 | 31.5 |
| Average | 31.9 | 31.725 |
| Volume, μL | 32.0 | 31.8 |
| 6 | 32.1 | 32.0 |
|   | 32.0 | 32.0 |
|   | 32.9 | 31.9 |
|   | 32.1 | 31.8 |
| Average | 32.27 | 31.92 |
| Volume, μL | 32.3 | 32.0 |
| 7 | [1]31.7 | 31.9 |
|   | 31.7 | 31.7 |
|   | 31.7 | 31.7 |
|   | 31.9 | 31.7 |
| Average | 31.77 | 31.75 |
| Volume, μL | 31.8 | 31.8 |
| *45.1% Sucrose w/w.* | | |
| 1 | 147.5 | 147.4 |
|   | 147.2 | 147.1 |
|   | 147.2 | 147.2 |
| Average | 147.3 | 147.23 |
| Volume, μL | 122.3 | 122.3 |
| 2 | 148.4 | 148.5 |
|   | 147.9 | 147.9 |
|   | 147.9 | 148.0 |
| Average | 148.07 | 148.13 |
| Volume, μL | 122.9 | 122.9 |
| 5 | 38.5 | 38.2 |
|   | 38.2 | 38.2 |
|   | 38.4 | 38.2 |
| Average | 38.37 | 38.2 |
| Volume, μL | 31.8 | 31.7 |
| 6 | 38.6 | 38.6 |
|   | 38.5 | 38.5 |
|   | 38.5 | 38.5 |
| Average | 38.53 | 38.53 |
| Volume, μL | 32.0 | 32.0 |

[1] Transferred immediately without weighting.

The detergent solution density was not appreciably different from water and yielded very similar results. With sucrose, slightly more variation was seen than with water alone.

In each of the above examples, the volumes were calculated using a density of 0.9981 for water and SDS and 1.2048 for 45.1 percent sucrose at 23.5°C. A summary of the results is shown in table III.

It is evident that errors in measurement and loss in transfer can be kept within a desired range of 1 percent. As indicated in the experiments, the nylon tubes were found to be inferior to Kel-F tubes due primarily to the high fluid absorption rate of nylon. Thus, it will be seen that an accurate method and apparatus therefor for measurement and transfer of small fluid volumes have been provided which are independent of the fluid density, viscosity, and surface tension and is well adapted to automated manipulation, and the method can be employed in both zero and nonzero gravity environments.

TABLE III

| Tube No. | $H_2O$ Measured | $H_2O$ Transferred | SDS Measured | SDS Transferred | 40.1% Sucrose Measured | 40.1% Sucrose Transferred |
|---|---|---|---|---|---|---|
| 1 | 122.2 | 122.2 | 122.4 | 122.5 | 122.3 | 122.2 |
| 2 | 123.7 | 123.5 |   |   | 122.9 | 122.9 |
| 3 | 121.5 | 121.3 |   |   |   |   |
| 4[1] | 124.9 | 124.2 |   |   |   |   |
| 5 | 32.1 | 31.9 | 32.0 | 31.9 | 31.8 | 31.7 |
| 6 | 32.2 | 32.2 | 32.3 | 32.0 | 32.0 | 32.0 |
| 7 | 31.9 | 32.0 | 31.8 | 31.8 |   |   |
| 8[1] | 31.3 | 31.0 |   |   |   |   |

[1] Measuring tubes of Nylon. All others made of Kel-F.

In view of the above and numerous other equally possible arrangements, the scope of the invention should be considered limited only by the following claims attached to and forming a part of this specification.

I claim:

1. A method for accurately isolating a predetermined volumetric sample of fluid on a microanalytical scale, comprising the steps of:
   completely immersing an empty sample holder within a reservoir of fluid to be sampled, said sample holder defining a cavity of predetermined volume which terminates in an open mouth defined by an upstanding sharp-edged rim;
   centrifuging said sample holder and said reservoir of fluid in a manner tending to force said fluid into said cavity;
   removing sufficient fluid from said reservoir so that said sharp-edged rim is no longer immersed therein; and
   centrifuging said sample holder a second time in a manner tending to flatten the fluid meniscus in said open mouth at a level even wtih said sharp-edged rim.

2. A method as set forth in claim 1 wherein said fluid reservoir and said sample holder are centrifuged at a speed sufficient to force substantially all of the entrapped air bubbles form the cavity of said sample holder.

3. A method as set forth in claim 2 wherein said sample holder is positioned in a well at the bottom of said fluid reservoir and said reservoir is covered during centrifugation to prevent the effects of windage when collecting a sample and flattening the fluid meniscus.

4. A method of measuring and quantitatively transferring discrete volumetric samples of fluid on a microanalytical scale, comprising the steps of:
   completely immersing an empty sample holder in a reservoir of fluid to be sampled, said sample holder having an opening therein of a predetermined reproducible volume;
   centrifuging said sample holder and said reservoir of fluid in a manner tending to force said fluid into said cavity and completely fill said cavity;
   removing sufficient fluid from said reservoirs so that the cavity opening of said sample holder is no longer immersed therein;
   centrifuging said sample holder a second time in a manner tending to flatten the fluid meniscus formed at the opening of said cavity;
   inverting the filled sample holder into a transfer container; and
   centrifuging said transfer container in a manner so that said fluid sample filling said sample holder is quantitatively transferred to said transfer container.